US012039723B2

(12) United States Patent
Dai et al.

(10) Patent No.: US 12,039,723 B2
(45) Date of Patent: Jul. 16, 2024

(54) DEEP LEARNING FOR NEAR-INFRARED FLUORESCENCE IMAGING ENHANCEMENT

(71) Applicant: The Board of Trustees of the Leland Stanford Junior University, Stanford, CA (US)

(72) Inventors: Hongjie Dai, Cupertino, CA (US); Zhuoran Ma, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 334 days.

(21) Appl. No.: 17/472,620

(22) Filed: Sep. 11, 2021

(65) Prior Publication Data

US 2022/0084201 A1 Mar. 17, 2022

Related U.S. Application Data

(60) Provisional application No. 63/077,524, filed on Sep. 11, 2020.

(51) Int. Cl.
  *G06N 3/088* (2023.01)
  *G06N 3/04* (2023.01)
  *G06T 7/00* (2017.01)

(52) U.S. Cl.
  CPC ............ *G06T 7/0012* (2013.01); *G06N 3/04* (2013.01); *G06T 2207/10048* (2013.01); *G06T 2207/10056* (2013.01); *G06T 2207/20081* (2013.01); *G06T 2207/20084* (2013.01); *G06T 2207/30004* (2013.01)

(58) Field of Classification Search
  USPC .............. 382/128–302; 706/1–62, 900–903
  See application file for complete search history.

(56) References Cited

U.S. PATENT DOCUMENTS

| 10,657,584 B1* | 5/2020 | Kim ..................... G06N 3/045 |
| 2011/0082369 A1* | 4/2011 | Mohr ..................... A61B 1/043 |
| | | 600/431 |
| 2019/0282307 A1* | 9/2019 | Azizian ............... A61B 90/361 |
| 2021/0325308 A1* | 10/2021 | Kannan ............. G01N 21/6458 |
| 2022/0145175 A1* | 5/2022 | Dai .................... A61K 49/1824 |

OTHER PUBLICATIONS

Ali Erturk; Methods For Large Tissue Labeling, Clearing And Imaging; 2018 (Year: 2018).*
Zhuoran Ma; Deblurring near infrared fluorescence images with CycleGAN; 2020 (Year: 2020).*
(Continued)

*Primary Examiner* — Marcellus J Augustin
(74) *Attorney, Agent, or Firm* — LUMEN PATENT FIRM

(57) ABSTRACT

A method for enhancing a near-infrared fluorescence image includes providing a NIR fluorescence image produced by detecting light in the NIR-I or NIR-IIa windows emitted by fluorophores; and inputting the NIR fluorescence image to a convolutional neural network to produce as output a translated image, where the convolutional neural network is trained using a set of NIR-I or NIR-IIa fluorescence images and a set of NIR-IIb fluorescence images. Preferably, the convolutional neural network is a U-Net.

3 Claims, 12 Drawing Sheets

(56) References Cited

OTHER PUBLICATIONS

Hong Guosong; High Resolution Imaging Using Near-Infrared-II Fluorescence; 2014 (Year: 2014).*

High Resolution Imaging Using Near-Infrared-II Fluorescence (Year: 2014).*

Lim et al., CycleGAN with a Blur Kernel for Deconvolution Microscopy: Optimal Transport Geometry. arXiv:1908.09414v3 [eess.IV] Jul. 8, 2020.

Zhuoran Ma, Haotian Du. Deblurring near infrared fluorescence images with CycleGAN. CS230: Deep Learning, Winter 2020.

Zhu et al., Unpaired Image-to-Image Translation using Cycle-Consistent Adversarial Networks. Aug. 24, 2020. arXiv:1703.10593v7 [cs.CV].

Tang et al., Unpaired Low-Dose CT Denoising Network Based on Cycle-Consistent Generative Adversarial Network with Prior Image Information. Comp. and Math. Methods in Medicine. vol. 2019.

* cited by examiner

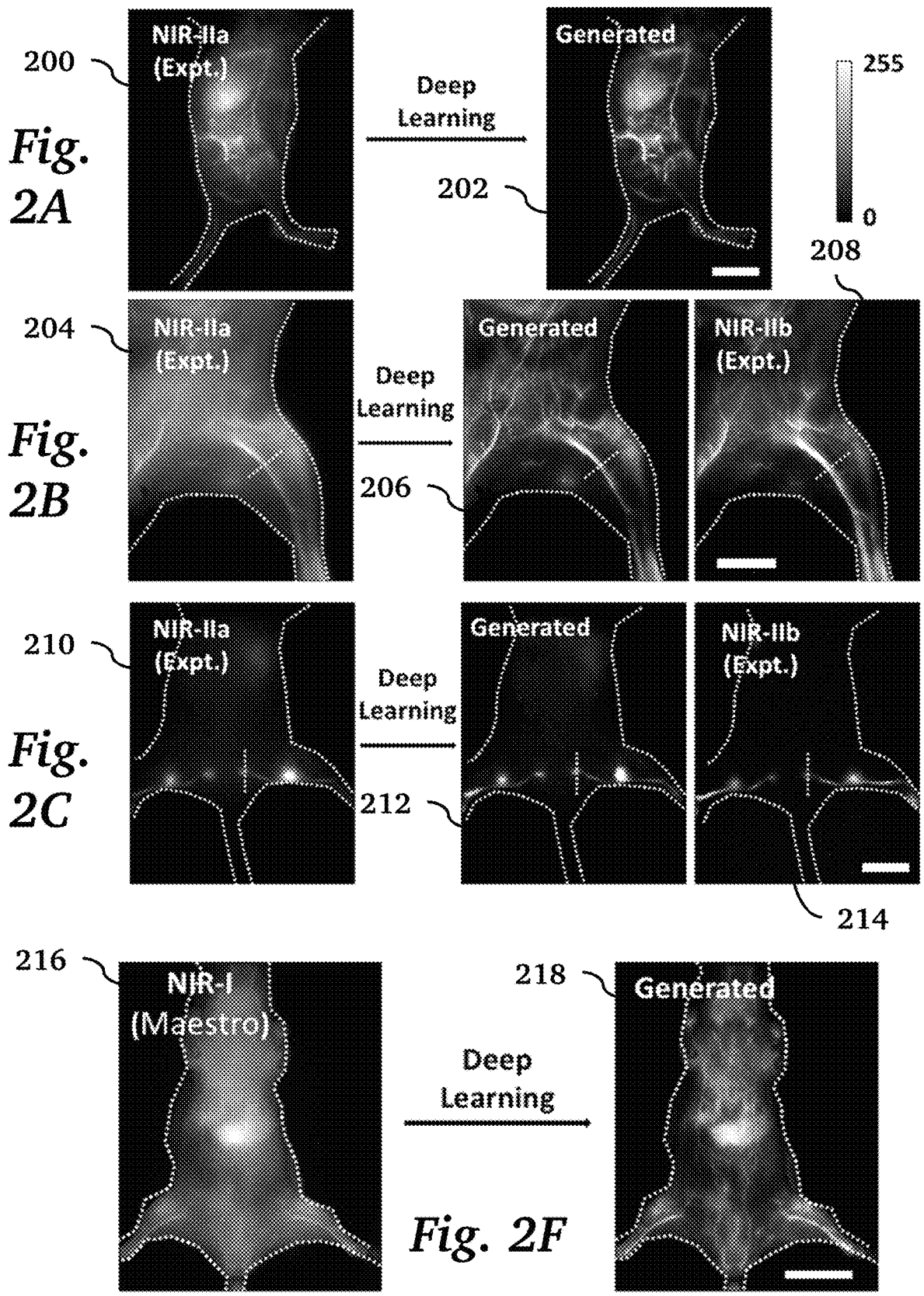

IRDye800 • Cetuximab Conjugate

NIR-I (Expt.) 300   Generated 304

NIR-IIa (Expt.) 302   Generated 306

308 NIR-I (Expt.)   310 Generated

255

0

DEEP LEARNING FOR NEAR-INFRARED FLUORESCENCE IMAGING ENHANCEMENT

CROSS-REFERENCE TO RELATED APPLICATIONS

This application claims priority from U.S. Provisional Patent Application 63/077,524 filed Sep. 11, 2020, which is incorporated herein by reference.

STATEMENT OF FEDERALLY SPONSORED RESEARCH

This invention was made with Government support under contract NS105737 awarded by the National Institutes of Health. The Government has certain rights in the invention.

FIELD OF THE INVENTION

The present invention relates generally to near infrared (NIR) fluorescence imaging and microscopy. More specifically, it relates to techniques for NIR fluorescence image quality enhancement.

BACKGROUND OF THE INVENTION

Detecting fluorescence in the second near-infrared window (NIR-II) (1000-1700 nm) has emerged as a novel in vivo imaging modality with high spatial and temporal resolution through millimeters tissue depths. Imaging in the NIR-IIb window (1500-1700 nm) is the most effective one-photon approach to suppressing light scattering and maximizing imaging penetration depth. Nanoparticle probes in the NIR-IIb window, however, have disadvantages such as toxicity, poor brightness, and/or lack of regulatory approval. On the other hand, imaging the NIR-I window (700-1000 nm) or NIR-IIa window (1000-1300 nm) can be done using biocompatible small-molecule fluorescent probes including FDA approved dyes, but imaging the NIR-I window has the disadvantage of suboptimal imaging quality due to more light scattering at these wavelengths. There remains a need to provide higher quality NIR fluorescence imaging using molecular probes already approved for human use.

Image processing methods, such as deconvolution, have been explored to improve the resolution of the fluorescence imaging, but these methods rely on a priori information about the specific imaging system, and they are difficult to generalize to new optical systems.

SUMMARY OF THE INVENTION

We trained artificial neural networks to transform a fluorescence image in the shorter wavelength NIR window of 900-1300 nm (NIR-I/IIa) to an image resembling a NIR-IIb image which has enhanced image quality.

The deep-learning-based methods of the present invention may be used with NIR fluorescence images produced using a wide range of NIR fluorophores and targeting ligands, regardless of their detailed optical and biological properties. These methods may also be applied to other fluorescence imaging systems, such as CRi's Maestro fluorescence imaging platform, establishing the generality of this method.

The technique makes use of a large training set containing NIR-I/NIR-IIa images and higher quality NIR-IIb images. These images are used to train neural networks using the CycleGAN or pix2pix algorithms, depending on whether or not the images include pairs of an NIR-I/NIR-IIa and corresponding NIR-IIb "ground truth" image.

In one implementation, we trained a CycleGAN model using two large sets of in vivo mice wide-field fluorescence images taken in the NIR-IIa and NIR-IIb windows, respectively. After training, the generator network could transform a blurred NIR-IIa image to one resembling a NIR-IIb image without obvious artifacts.

In another implementation, we trained a pix2pix model using two large sets of paired light-sheet microscope (LSM) images taken in the NIR-IIa and NIR-IIb windows, respectively. After training, the generator network was used to transform NIR-IIa LSM images at different depths.

With deep-learning image translation, in vivo lymph node imaging with ICG achieved an unprecedented signal-to-background ratio of more than 100. Using pre-clinical fluorophores such as IRDye-800, translation of ~900 nm NIR molecular imaging of PD-L1 or EGFR greatly enhanced tumor-to-normal tissue ratio up to ~20 from ~5 and improved tumor margin localization. Further, deep learning greatly improved in vivo non-invasive NIR-II light-sheet microscopy (LSM) in resolution and signal/background. NIR imaging equipped with deep learning may be used to facilitate basic biomedical research and to empower clinical diagnostics and imaging-guided surgery in the clinic.

Traditional NIR-I imaging in the 800-900 nm range has entered clinical trials for tumor imaging and imaging-guided resection surgery, with a caveat of low tumor-to-normal tissue ratio (T/NT) ~3-5 limited by light scattering and auto-fluorescence problem. After image processing with the neural network, a high T/NT of ~20 can be achieved, which is ~5 times higher than those of the original images. The significantly improved image clarity and sharper resection margin allowed more precise removal of the tumors while minimized damage to surrounding normal tissues, which is a key requirement for imaging-guided resection surgery in clinics.

We also demonstrated that an unprecedented lymph node-to-background ratio of more than 100 could be achieved for ICG based imaging after image transformation by the neural network, which could enhance sentinel lymph node mapping in clinics.

Further, we explored deep learning for NIR light-sheet microscopy (LSM) using organic probes, achieving optical sectioning performance matching any previous one-photon and multi-photon techniques at up to ~2.5 mm depth.

In one aspect, the invention provides a method for enhancing a near-infrared fluorescence image, the method comprising: providing a NIR fluorescence image produced by detecting light in the NIR-I or NIR-IIa windows emitted by fluorophores; and inputting the NIR fluorescence image to a convolutional neural network to produce as output a translated image, where the convolutional neural network is trained using a set of NIR-I or NIR-IIa fluorescence images and a set of NIR-IIb fluorescence images. Preferably, the convolutional neural network is a U-Net. The convolutional neural network may be trained in different embodiments using the CycleGAN or pix2pix algorithms. In some embodiments, the NIR fluorescence image is a light-sheet microscope (LSM) image.

BRIEF DESCRIPTION OF THE DRAWINGS

FIG. 2A illustrates an example of a real NIR-IIa image and corresponding enhanced image generated as output from a deep learning neural network, according to an embodiment of the invention.

FIG. 2B illustrates an example of an in vivo fluorescence image and corresponding enhanced image generated as output from a deep learning neural network, compared with a real NIR-IIb image, according to an embodiment of the invention.

FIG. 2C illustrates an example of an in vivo fluorescence image and corresponding enhanced image generated as output from a deep learning neural network, compared with a real NIR-IIb image, according to an embodiment of the invention.

FIG. 2F illustrates an example of a NIR-I image and corresponding enhanced image generated as output from a deep learning neural network, according to an embodiment of the invention.

DETAILED DESCRIPTION OF THE INVENTION

Figure 1A:
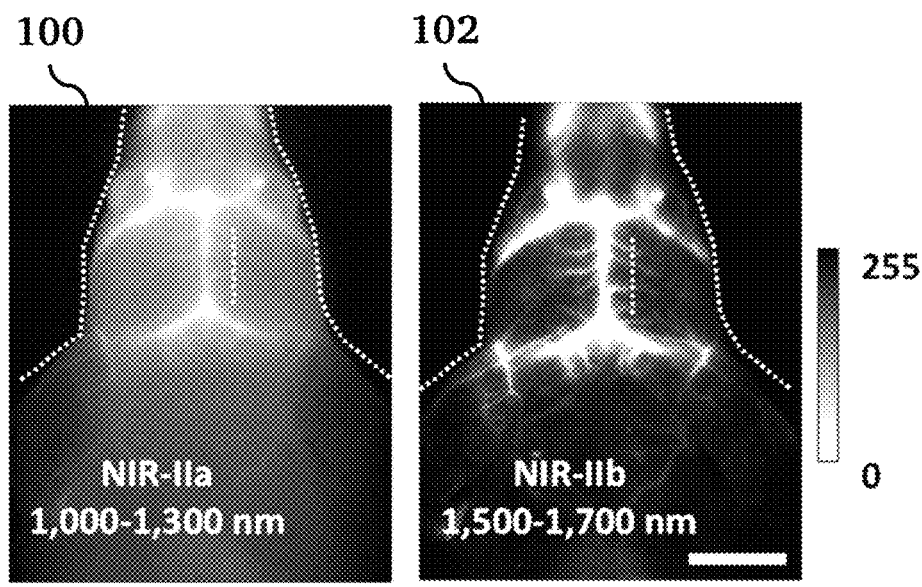
FIG. 1A shows a comparison of NIR-IIa and NIR-IIb images of a mouse, illustrating the difference in image quality in these two windows.

Fluorescence detection in the second near-infrared window (1,000-1,700 nm, NIR-II window) has been explored for non-invasive in vivo imaging benefiting from deeper tissue penetration, lower background and higher spatial resolution afforded by reduced light scattering and diminished autofluorescence. Imaging at the long-wavelength end of the NIR-II window (1,500-1,700 nm, NIR-IIb) benefits the most, allowing single-cell resolution at sub-centimeter tissue penetration depth. Several classes of materials have been explored as NIR-IIb fluorescent probes for in vivo imaging, including carbon nanotubes, inorganic semiconducting quantum dots, rare-earth-based down-conversion nanoparticles, and nanoparticles of organic molecules. Some of the probes contain toxic elements such as Pb, Cd and As that hinder clinical translation. In contrast, organic small-molecule fluorophores exhibit favorable excretion pharmacokinetics and low in vivo toxicity. Several organic fluorescent probes have been approved by the FDA or are under clinical trials, such as indocyanine green (ICG), methylene blue (MB) and bioconjugates of IRDye800CW24. By exploiting the off-peak emission tail of FDA-approved fluorophores in the NIR-II window, the imaging quality of ICG and related dyes can be further improved. Nevertheless, small-molecule fluorophores reported thus far mainly emit in the conventional near infrared window (NIR-I, 700-1,000 nm) and the short-wavelength region of the NIR-IIa window (1,000-1,300 nm, NIR-IIa), which are not optimal for deep-tissue imaging due to scattering.

Herein is disclosed methods using artificial neural networks for NIR imaging in the 900-1300 nm using a large set of NIR-IIb images accumulated in our lab over the years as targeted results. This allows for translating a smeared NIR image to produce sharp, high signal/background images achievable only in NIR-IIb. We employ the generative adversarial network (GAN), a class of deep learning algorithms that aims to generate new data with the same distribution as the training examples. Variants of GANs have been applied for image-to-image translation, in which an image belonging to one domain is transferred to an image in another domain. For instance, the pix2pix algorithm learns a mapping from one domain to another by training on pairs of images. However, it can be time-consuming and not possible to collect paired data in many cases, and unsupervised algorithms, such as CycleGAN29, have been proposed to circumvent this problem. In the CycleGAN model, a pair of mappings F: A→B and G: B→A are learnt, and a cycle consistency loss is introduced to make sure F(G(A))≈A and vice versa. These image-to-image translation algorithms have been explored for biomedical image synthesis tasks, such as cross-modality medical image transfer, denoising low-dose medical images and reconstructing super-resolved microscopic images from low-resolution inputs. Compared to traditional image processing techniques, the data-driven deep learning approaches typically use less prior knowledge of the image formation processes and hand-engineered features. Once the neural networks are trained, they can readily be used to generate images without further manual parameter search.

To enable artificial neural networks transforming a fluorescent image in the NIR-IIa (1000-1300 nm) window to one in the NIR-IIb (1500-1700 nm) window, we trained a CycleGAN model using two large sets of in vivo mice wide-field fluorescence images taken in the NIR-IIa and NIR-IIb windows, respectively. After training, the generator network transforms a blurred NIR-IIa image to one resembling a NIR-IIb image without obvious artifacts. The neural networks generalized well to previously unseen data, allowing rapid image processing without further parameter optimization after training. Furthermore, the methods trained in NIR-IIa can be extended to improve NIR-I~900 nm fluorescence imaging, a modality already used in clinical trials for human use, without the need of using a large set of NIR-I images for training. Lymph node imaging with the clinical gold standard NIR dye ICG achieved an unprecedented signal-to-background ratio (SBR) of >100 after image transformation. Further, we demonstrated that molecular imaging using a fluorophore-antibody complex with high tumor targeting specificity in the NIR-I and NIR-IIa windows cab be significantly improved by the neural networks. Upon imaging transformation a high EGFR over-expressing tumor-to-normal tissue signal ratio of ~20 can be realized using an IRDye 800CW-Cetuximab conjugate in the NIR-I and NIR-IIa windows. The reduced background also allows identification of tumor margins more precisely to potentially facilitate imaging guided tumor resection. Lastly, we show that GAN-based image-to-image translation algorithms can enhance NIR-IIa light-sheet microscopy (LSM) by utilizing the supervised pix2pix model owing to existing paired NIR-IIa and NIR-IIb LSM images. The generated LSM images exhibited similar SBR and size of vasculatures to the ground-truth NIR-IIb LSM images at various depths, increasing the depth limit of one-photon LSM in the NIR-IIa window from <2 mm to ~2.5 mm.

Training a CycleGAN Model for NIR Image Processing

Figure 1B:
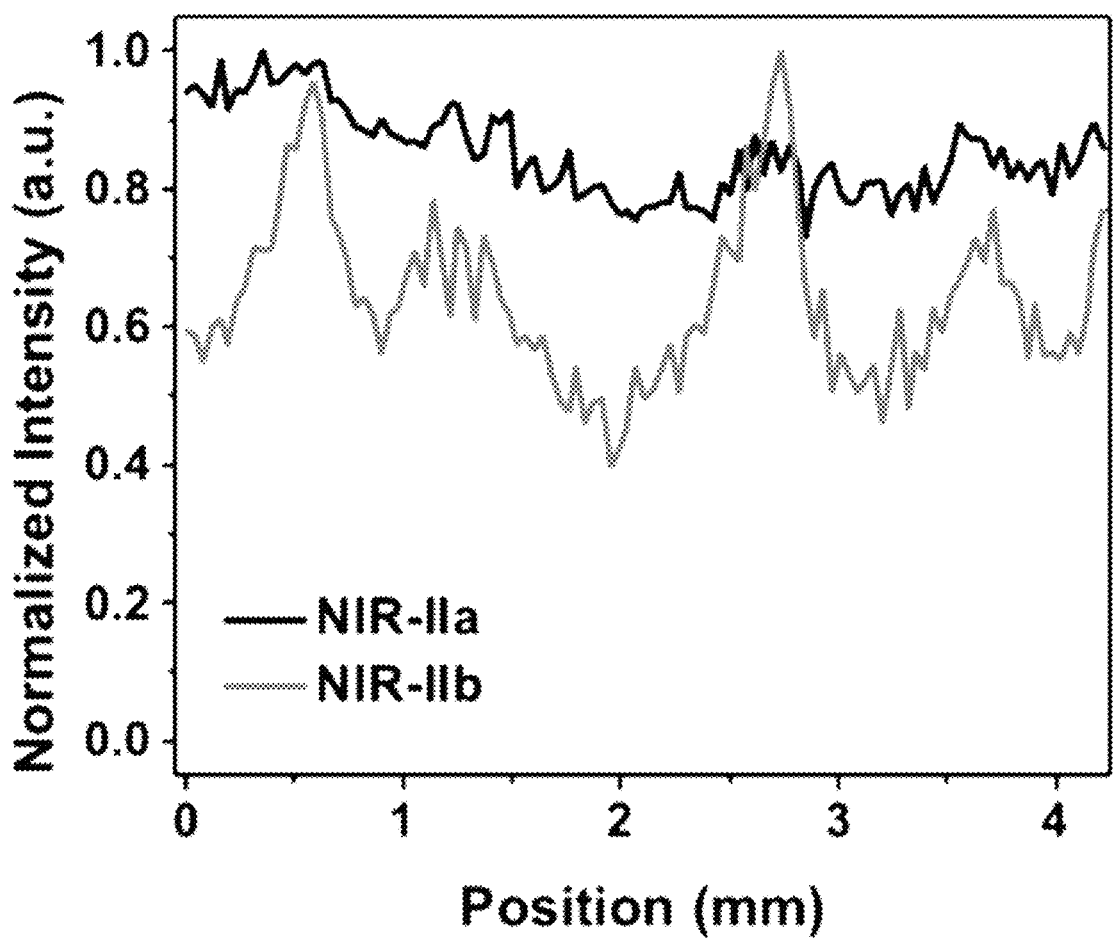
FIG. 1B is a graph showing cross-sectional intensity profiles of an area imaged in the NIR-IIa and NIR-IIb windows.

Using thousands of in vivo fluorescence images of mice, we trained a CycleGAN model to transfer a wide-field NIR-IIa (1,000-1,300 nm) image 100 to a NIR-IIb (1,500-1,700 nm) image 102, an example of which is shown in FIG. 1A. We employed 1,024 in vivo fluorescent mouse NIR-IIa images and 1,800 NIR-IIb images recorded in our laboratory in the past five years. The images were randomly split into training, validation and test sets with a ratio of 80:10:10. To further increase the diversity of the training set, random horizontal flip was applied for data augmentation. We analyzed the signal-to-background ratio (SBR) of the images by plotting the cross-sectional intensity profiles of the same area in the NIR-IIa and NIR-IIb windows, as shown in the graph of FIG. 1B. A much higher SBR in the NIR-IIb window was observed due to reduced scattering.

CycleGAN-Based NIR-IIa-to-NIR-IIb Image Transfer.

Figure 1C:
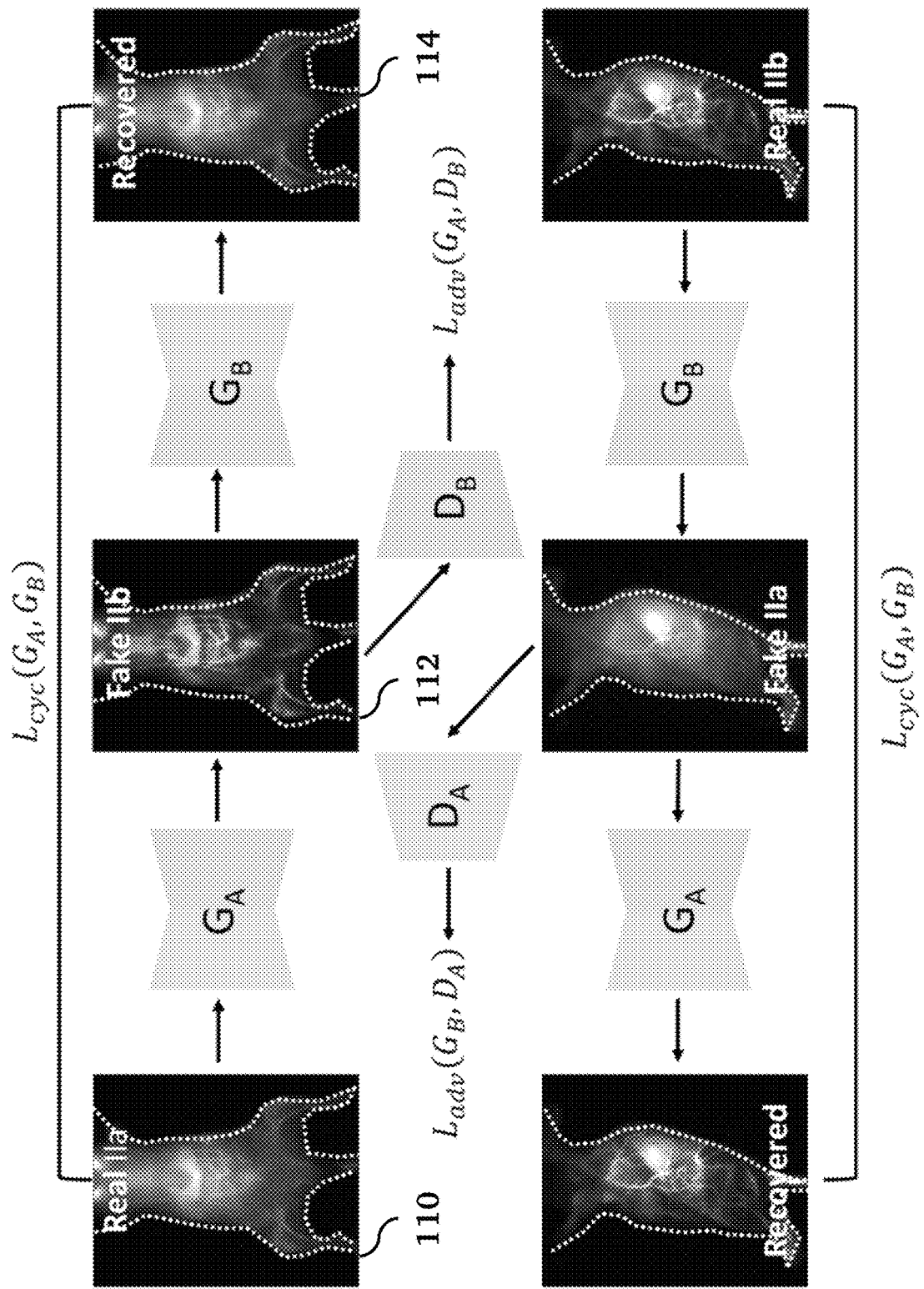
FIG. 1C is a schematic diagram illustrating a training process of a CycleGAN model used to train a network to translate an NIR-IIa image to a NIR-IIb image, according to an embodiment of the invention.

FIG. 1A shows a comparison of example NIR-IIa and NIR-IIb images. A balb/c mouse was injected with p-FE and $P^3$-QDs at the same time, and excited by an 808-nm laser. A 1,000-nm long-pass filter and a 1,200-nm short-pass filter were used to collect NIR-IIa image, and an 1,500-nm long-pass filter was used to collect NIR-IIb image. Scale bar shown is 5 mm. FIG. 1B shows cross-sectional intensity profiles of the same area imaged in the NIR-IIa and NIR-IIb windows. FIG. 1C illustrates a training process of the CycleGAN model used in an embodiment of the invention. A NIR-IIa image 110 was randomly selected from the training set, and processed by the generator $G_A$ to obtain a fake NIR-IIb image 112, which was used as input for another generator $G_B$ to reconstruct the original NIR-IIa image 114. A discriminator $D_B$ was trained to tell whether a NIR-IIb image was real or fake. A cycle consistency loss ($L_{cyc}$) was defined to ensure meaningful image-to-image translation. The overall loss is a weighted sum of the adversarial loss ($L_{adv}$) and the cycle consistency loss $$L(G_A,G_B,D_A,D_B)=L_{adv}(G_A,D_B)+L_{adv}(G_B,D_A)+\lambda L_{cyc}(G_A,G_B).$$

Figure 1D:
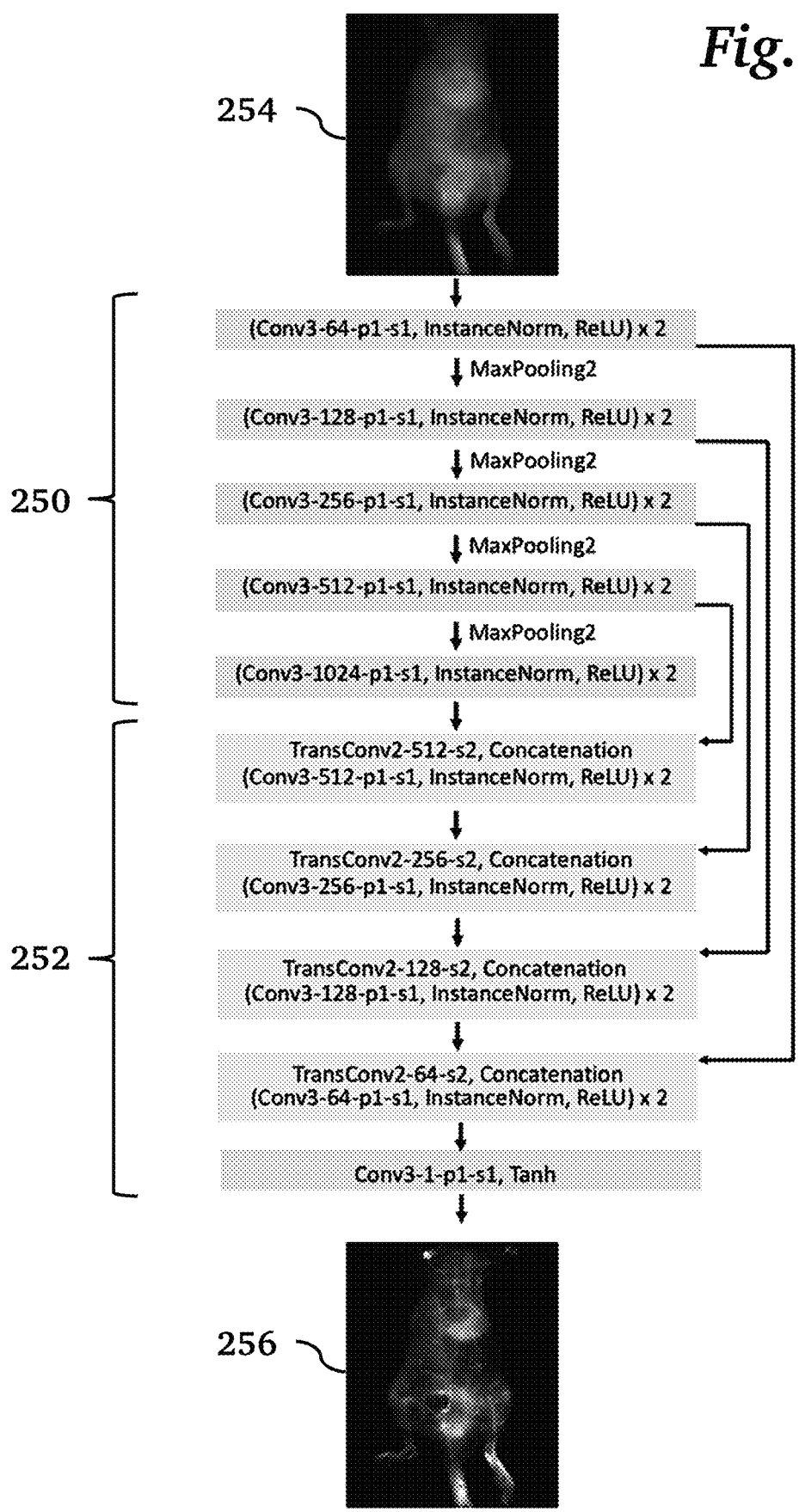
FIG. 1D is a diagram showing the architecture of a neural network implementing a U-Net generator, according to an embodiment of the invention.

In the CycleGAN model, a pair of generators $G_A$ and $G_B$ were applied to transform images from one domain to another, and a pair of discriminators $D_A$ and $D_B$ were used to differentiate real images from generated ones, as shown in FIG. 1C. We used a U-Net38 architecture for the generators $G_A$ and $G_B$, as shown in FIG. 1D. It is composed of an encoding path 250, in which a feature map of the original image 254 was extracted by convolutional layers, and a decoding path 252, in which the extracted feature map was transformed to the final output image 256. A PatchGAN structure was used as the discriminators $D_A$ and $D_B$, as shown in FIG. 1F.

Returning to FIG. 1C, for an input NIR-IIa image x, $G_A(x)$ generated an image, and an adversarial loss $L_{adv}$ was applied to enforce the generated image looked similar to a real NIR-IIb image. Subsequently, $G_B(G_A(x))$ reconstructed the original image. To guarantee meaningful image-to-image translation, the reconstructed image was forced to be close to the original image by minimizing the cycle consistency loss $L_{cyc}$, which was defined as the L1 distance between the original image x and the reconstructed image $G_B(G_A(x))$. The total loss function was a weighted sum of the adversarial loss and the cycle consistency loss. The generators were trained to minimize the loss function, while the discriminators were trained to maximize the loss function. Once the neural networks were trained, only the generator $G_A$ was needed for NIR-IIa image processing.

Contrast-Enhanced Wide-Field NIR-IIa Fluorescence Imaging with CycleGAN

After the neural networks were trained, the generator $G_A$ was used to process NIR-IIa images. FIG. 2A shows an example of an NIR-IIa image 200 that is input to the trained deep learning network which generates an enhanced image 202. Note that all these examples were not seen as a priori by the neural networks during training. After image transformation, the contrast of the images was largely enhanced, while the features such as blood vessels, major organs and lymph nodes were preserved and sharpened.

Figure 2D:
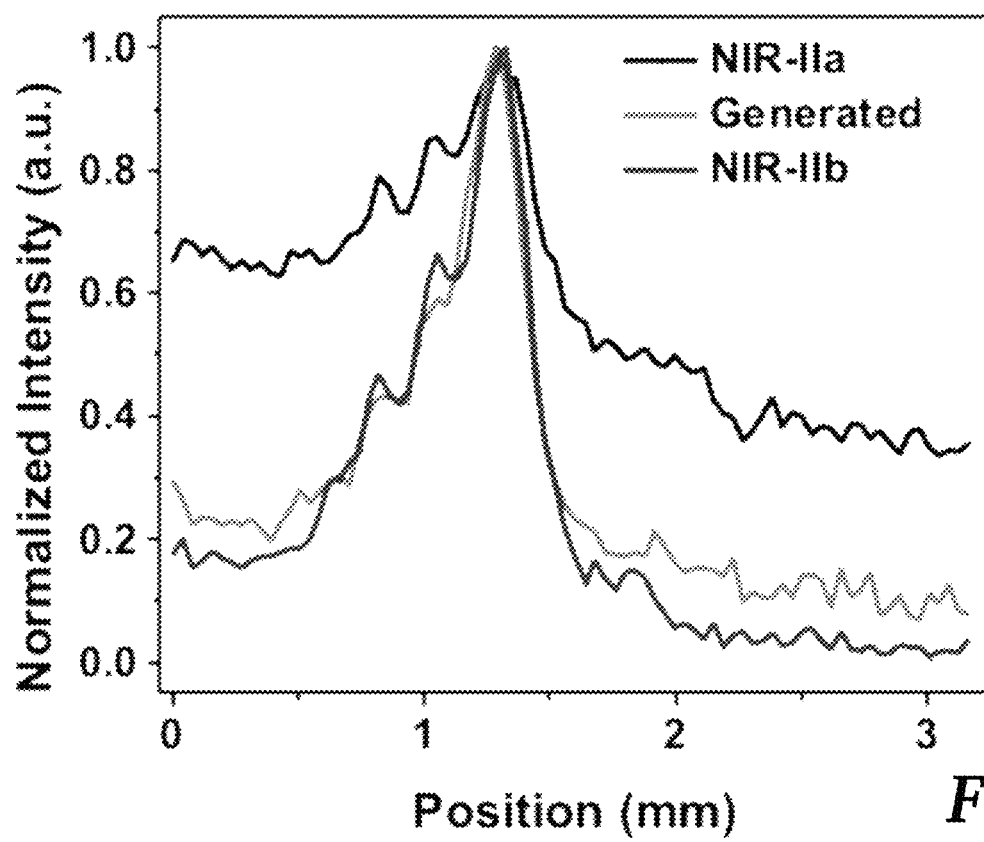
FIG. 2D is a graph showing cross-sectional intensity profiles of the same vessel in the NIR-IIa, NIR-IIb and generated images, according to an embodiment of the invention.

To confirm the validity of this neural network-based image processing method, a balb/c mouse was injected with a nanoscale NIR-IIa probe p-FE39 (hydrodynamic size ~12 nm) and a NIR-IIb fluorophore $P^3$-QD40 (hydrodynamic size ~26 nm) at the same time, and fluorescence imaging of mouse blood vessels labeled by the two probes in the NIR-IIa and NIR-IIb windows respectively were recorded to obtain matched images in the two domains, as illustrated in FIG. 2B. The trained neural network was utilized to process the NIR-IIa image 204, producing a generated image 206 that remarkably resembled the ground truth 208, i.e. in this case the NIR-IIb image. The NIR-IIb and generated images showed highly similar intensity profiles, as shown in FIG. 2D, and spatial frequency patterns, demonstrating that the generator could faithfully enhance the contrast of the NIR-IIa images without introducing artifacts.

We found that the nearest neighbor of the generated images in the training set looked similar to the generated images, but were not identical, which indicated that the neural network did not memorize the results from the training set and it generalized well to previously unseen data. Further, we analyzed the output feature map after the first two convolutional layers in the encoding part of the generator and found that some channels showed interpretable patterns. For example, channel 10 extracted background tissue of the mice, channel 30 labeled major organs including liver, spleen and tumor, and channel 32 showed regions outside the mice. These results further confirmed that the neural network learnt useful information from the training data, which was then utilized for synthesizing new images.

Figure 1E:
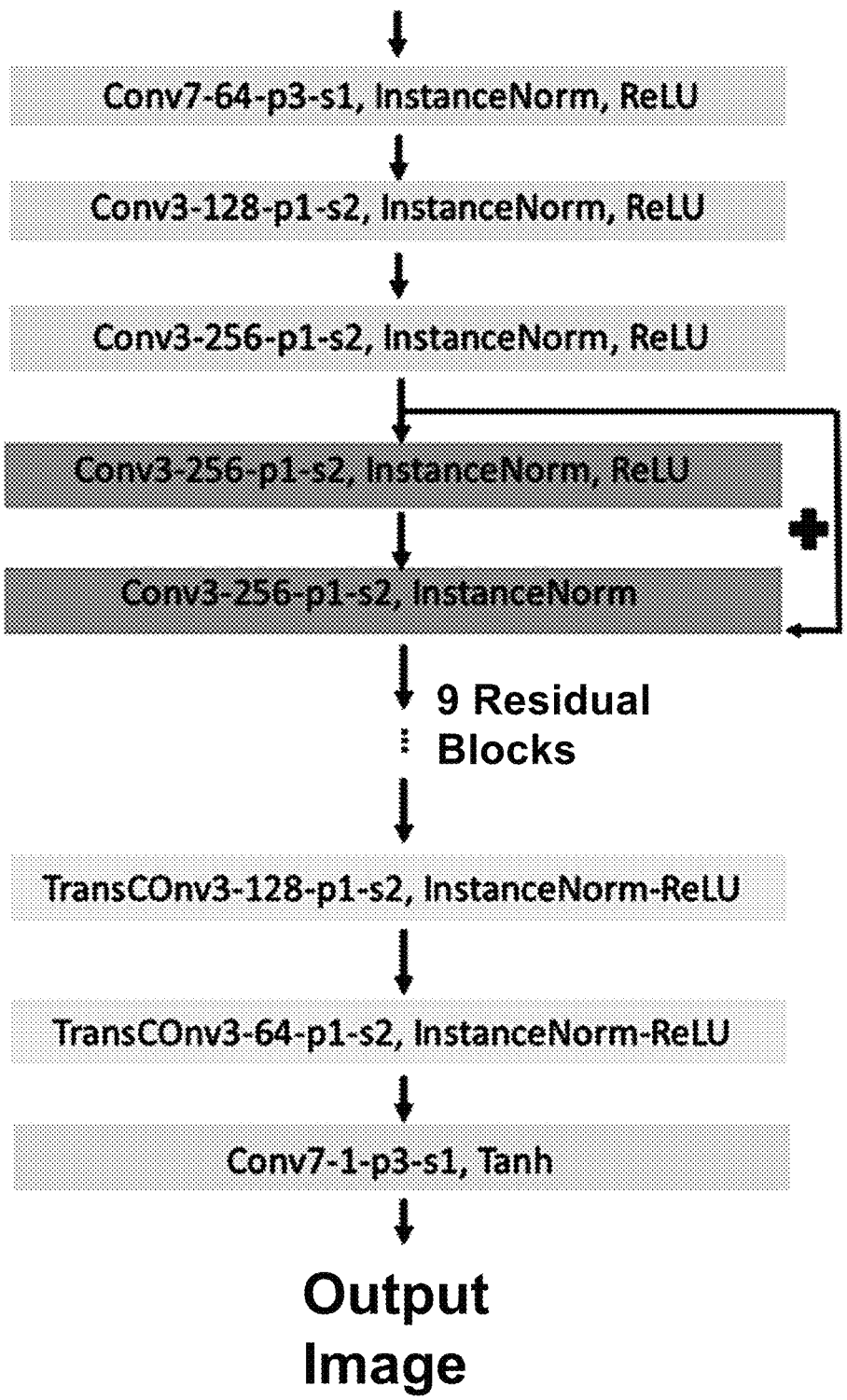
FIG. 1E is a diagram showing the architecture of a neural network implementing a ResNet generator, according to an embodiment of the invention.
Figure 1F:
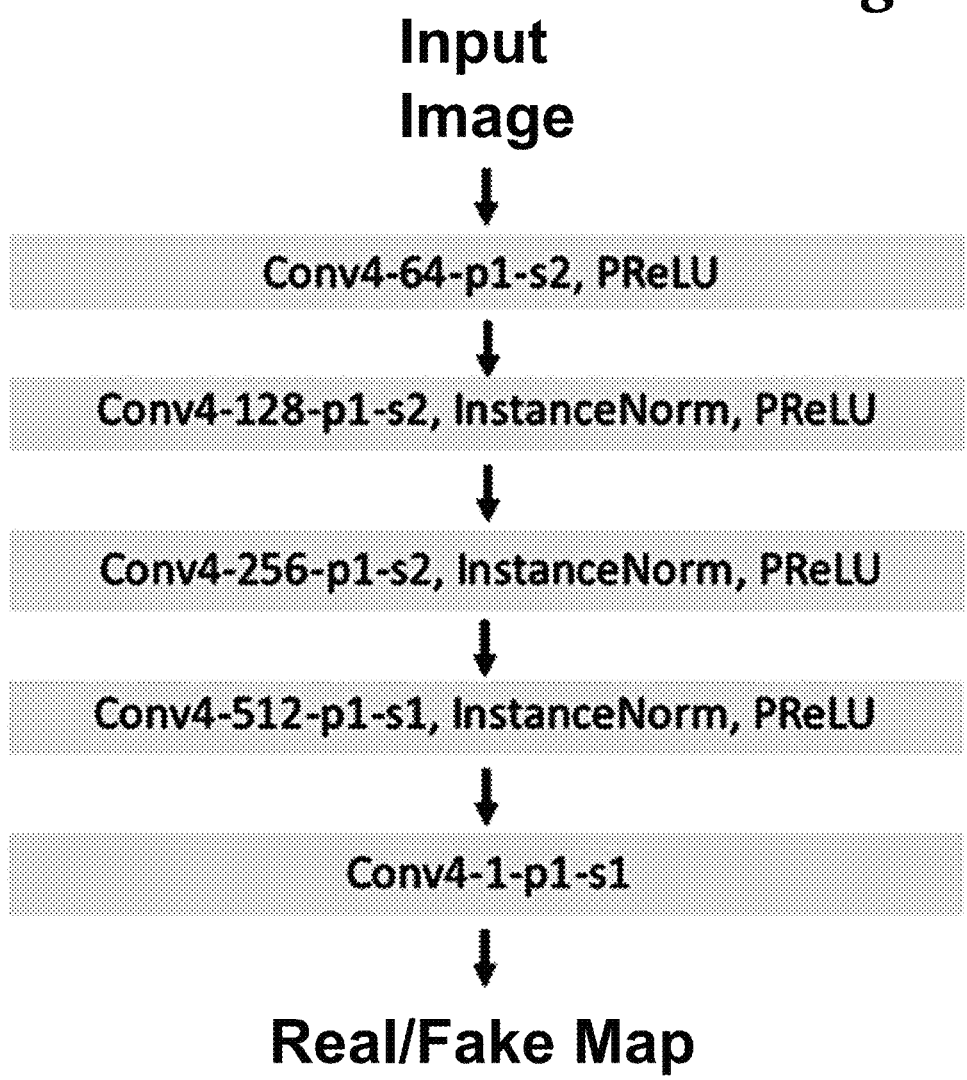
FIG. 1F is a diagram showing the architecture of a neural network implementing a PatchGAN discriminator, according to an embodiment of the invention.

We compared the U-Net generator with another commonly used network structure with residual blocks (denoted ResNet, shown in FIG. 1E). ResNet could also generate high-contrast image after training. However, it suffered from more artifacts as indicated by the mismatched spatial frequency patterns compared to the ground-truth NIR-IIb images. The better performance of the U-Net might be attributed to skipping the connections between the encoding path and the decoding path, which allowed context information captured in the encoding path to be passed to the decoding path more easily. To demonstrate the importance of both the adversarial loss and the cycle consistency loss, we performed ablation study on the full loss function in which the neural networks were trained with only the adversarial loss or the cycle consistency loss. Compared to the results using the full loss function, the generator performed much worse. We also optimized the training epochs. The neural networks failed to generate meaningful images after a small number of epochs. When the networks were trained for ~30-60 epochs, NIR-IIb-like image with high quality could be obtained. Further increasing the training iterations may also introduce artifacts, which was caused by overfitting of the training examples.

Encouraged by the successful application of neural networks for NIR-IIa-to-NIR-IIb image translation, we transformed wide-field NIR-IIa fluorescence images of lymph nodes using the trained generator. A FDA-approved small-molecule dye indocyanine green (ICG) was injected to the foot pads of the mouse concurrently with a NIR-IIb nanoparticle $P^3$-QD for comparison. The emission tail of ICG was utilized for imaging in the NIR-IIa window, and the obtained images 210 were processed by the trained U-Net generator to obtain contrast-enhanced images 212 as shown in FIG. 2C. The lymph node-to-background ratios measured with the NIR-IIa image 210, the generated image 212 and the NIR-IIb image 214 were 8.44, 117.0 and 159.1, respectively, for the superficial sacral lymph node, and 5.65, 39.2, and 45.0, respectively, for the deep lumbar lymph node. Comparison of the full width at half maximum (FWHM) of the lymph nodes at different depths also confirmed that the generated images closely resembled the real NIR-IIb images. Interestingly, the SBR of lymph node imaging in the NIR-I window could also be improved by the neural network, even though NIR-I images were not used for training. The improved SBR and higher resolution of the structures suggested that lymphatic imaging using an FDA-approved fluorescent dye can obtain similar image quality as NIR-IIb imaging using PbS-based probes, owing to deep learning.

Figure 2E:
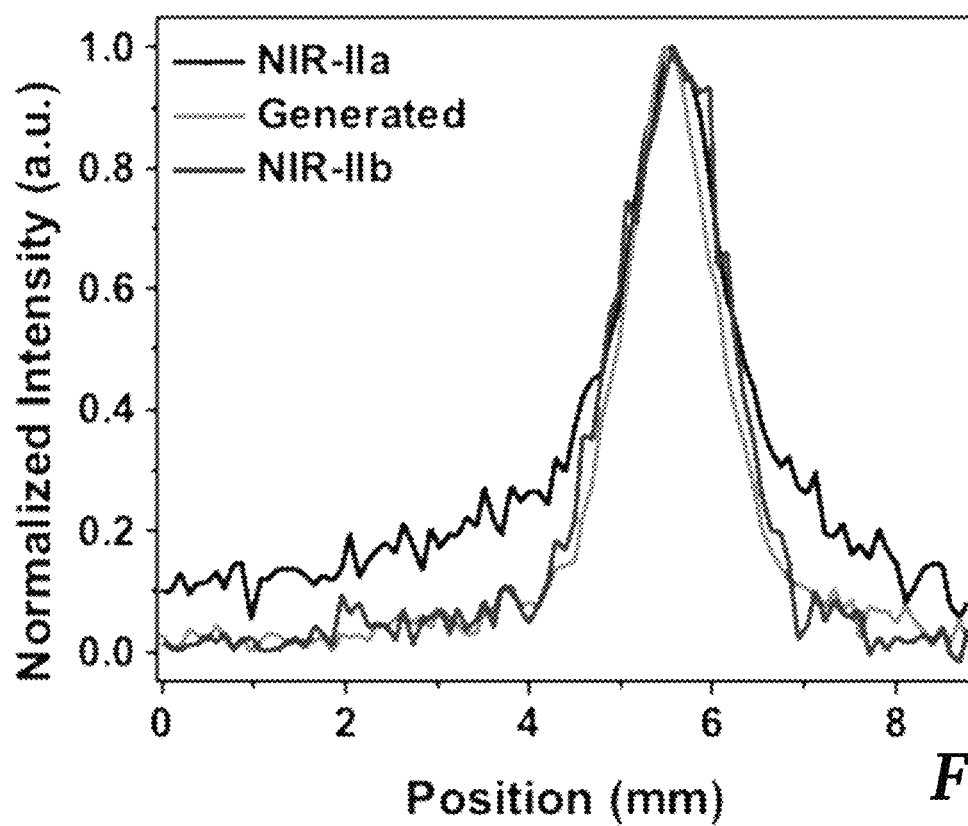
FIG. 2E is a graph showing normalized fluorescence intensity of the lines shown in FIG. 2C, according to an embodiment of the invention.

FIG. 2D is a graph showing cross-sectional intensity profiles of the same vessel in the NIR-IIa, NIR-IIb and generated images. FIG. 2E is a graph showing normalized fluorescence intensity of the dotted vertical lines shown in FIG. 2C.

Further, we applied the neural networks to process NIR-I images recorded by commercial imaging systems. A balb/c mouse was injected with IR783@BSA-GSH, and imaged with the CRi Maestro in vivo fluorescence imaging system in the NIR-I window. FIG. 2F shows an example of an NIR-I image 216 and generated image 218, where a balb/c mouse was injected with IR783@BSA-GSH complex, and imaged in the NIR-I window using a Cri's Maestro in vivo imaging system with an exposure time of 100 ms at 5 minutes post injection 42. The trained generator GA was used to transform the NIR-I image 216 to a high-resolution image 218. Upon image transformation with the trained generator, feature clarity, sharpness and signal-to-background ratio of the image were largely improved. Deep learning from images captured on home-built imaging system can afford neural networks easily applicable to other fluorescence imaging platforms, affording a broadly useful approach to enhancing in vivo NIR imaging in general.

CycleGAN Deep Learning for Molecular Imaging of Cancer

Figure 3A:
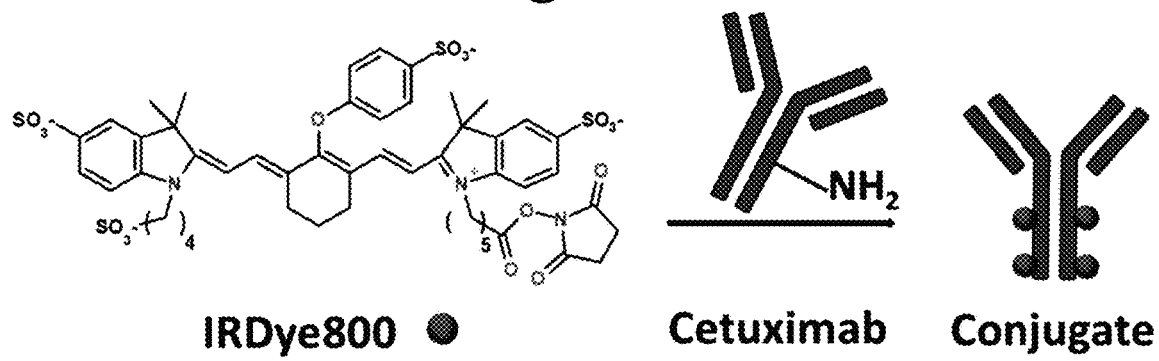
FIG. 3A illustrates conjugation of IRDye800-NHS to Cetuximab.
Figure 3B:
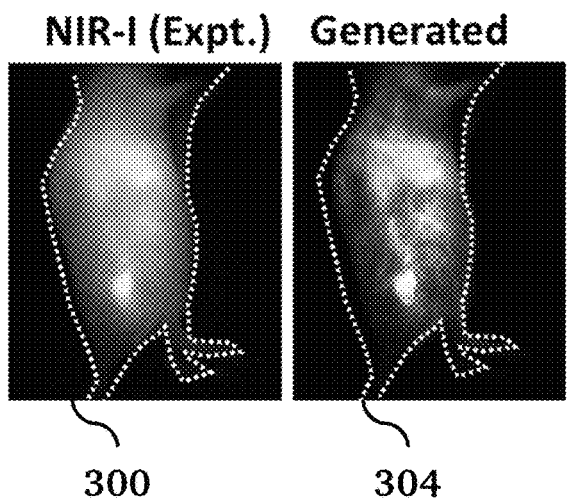
FIG. 3B and FIG. 3C show NIR-I and NIR-IIa images, respectively, together with corresponding enhanced image generated as output from a deep learning neural network, according to an embodiment of the invention.
Figure 3C:
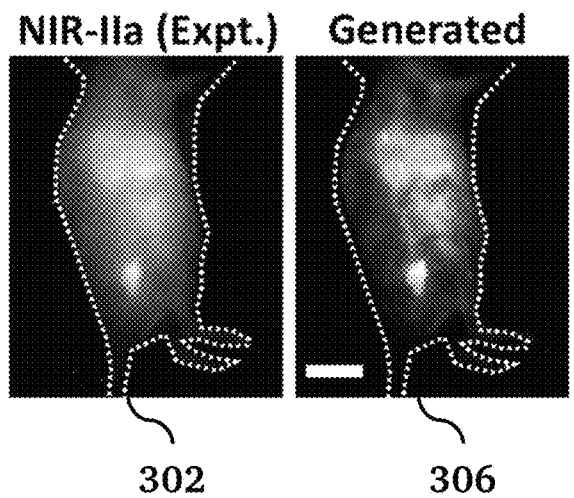
Figure 3D:
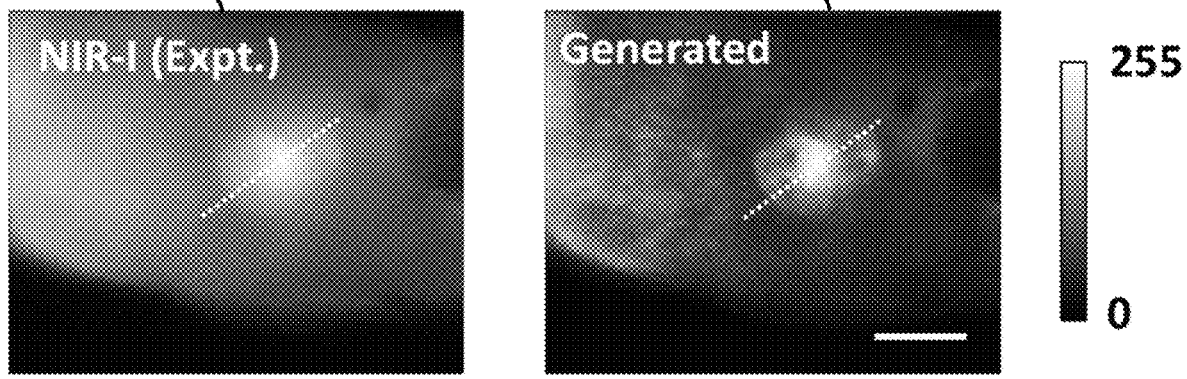
FIG. 3D shows High-resolution NIR-I image and corresponding enhanced image generated as output from a deep learning neural network, according to an embodiment of the invention.
Figure 3E:
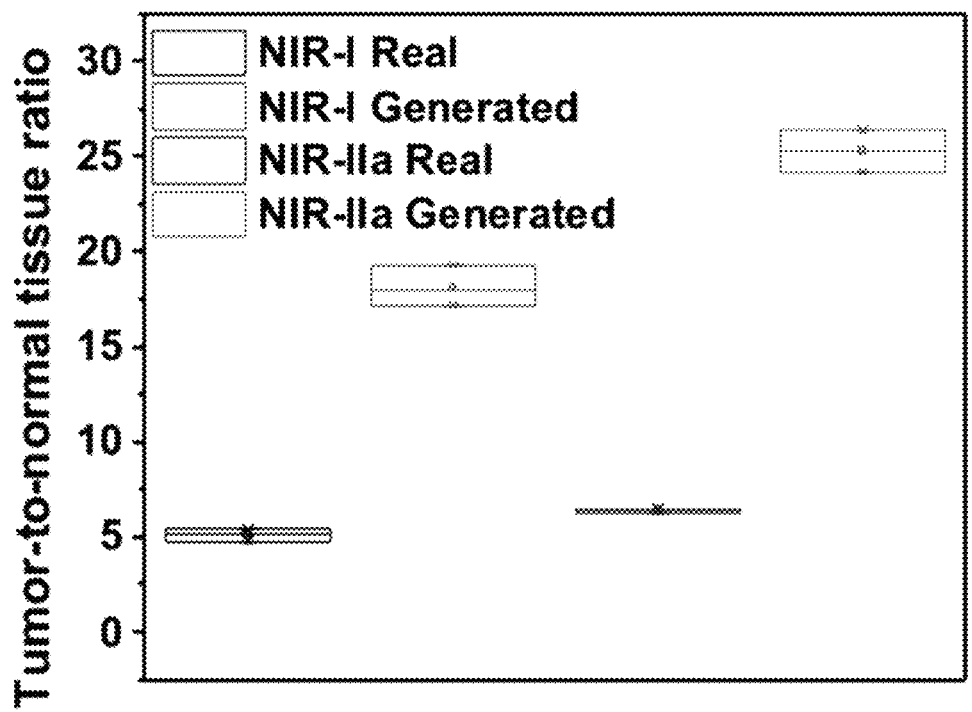
FIG. 3E is a plot showing tumor-to-normal tissue signal ratio of the real and generated images in the NIR-I and NIR-IIa windows, according to an embodiment of the invention.

Next, we investigated neural networks for near infrared molecular imaging of cancer using mouse tumor models. Traditional NIR-I imaging in the 800-900 nm range has entered clinical trials for tumor imaging and imaging guided resection surgery, with a caveat of low T/NT~3-5 limited by light scattering and autofluorescence problems. We investigated the squamous cell carcinoma of head and neck, 90% of which overexpressed the epidermal growth factor receptor (EGFR) that presented a molecular target for diagnosis and anticancer therapy. Bioconjugate of IRDye800CW and Cetuximab, a monoclonal antibody of EGFR, had been evaluated in clinical trials as a NIR-I imaging agent for detecting head and neck tumors during surgical procedures, but showed shallow imaging depth, low spatial resolution and signal/background ratios. To enhance molecular imaging in NIR-I by our deep learning image transformation approach, we implanted SCC-1 human cancer cells subcutaneously in athymic nude mice, and administered IRDye800CW-Cetuximab intravenously. FIG. 3A illustrates the conjugation of IRDye800-NHS to Cetuximab. The mice were then imaged in the NIR-I (900-1,000 nm) window to obtain image 300 (FIG. 3B) and imaged in the NIR-IIa (1,100-1,300 nm) window to obtain image 302 (FIG. 3C) at 24 hours post injection. These images were processed by the U-Net neural network to generate images 304 and 306, respectively. These generated images had a high T/NT of 18.2 in the NIR-I window, and 25.3 in the NIR-IIa window, which were 3-5 times higher than those of the original images. FIG. 3E is a plot showing tumor-to-normal tissue signal ratio of the real and generated images in the NIR-I and NIR-IIa windows.

Figure 3F:
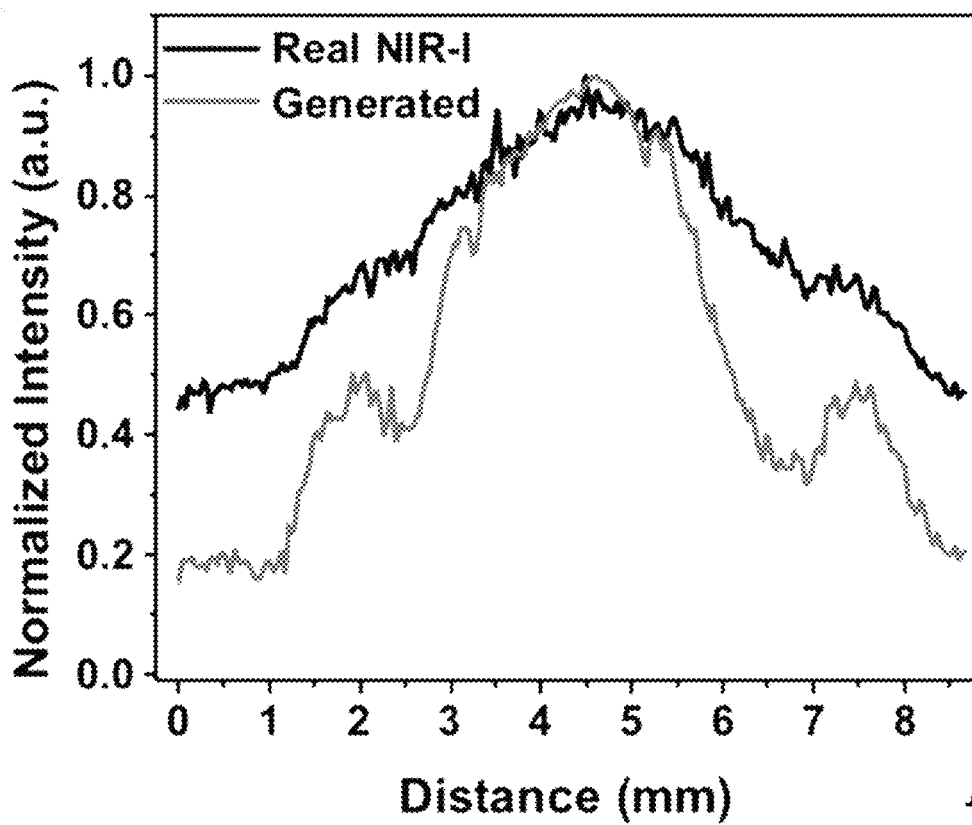
FIG. 3F is a plot showing fluorescence intensity of the lines shown in FIG. 3D, according to an embodiment of the invention.

In vivo fluorescence imaging has been explored in clinics for imaging-guided resection of tumors. We imaged the SCC-1 tumors at a higher magnification. FIG. 3D shows high-resolution NIR-I (900-1,000 nm) image 308 of a SCC-1 tumor at 24 hours after the injection of IR800CW-Cetuximab, and the network-generated image 310. FIG. 3F shows the fluorescence intensity of the diagonal lines shown in FIG. 3D. The cross-sectional line profile of the generated image showed a clearer margin compared to that of the original image. The significantly improved image clarity and sharper resection margin allowed more precise removal of the tumors while minimized damage to surrounding normal tissues, which is a key requirement for imaging-guided resection surgery in clinics.

We further explored enhancing NIR-I and NIR-IIa molecular imaging in a mouse model of immunotherapy based on anti-PD-L1. Immunotherapy based on checkpoint blockade of the programmed cell death protein-1 (PD-1) or its ligand PD-L1 has shown great promise for treating cancer in clinics. In vivo molecular imaging could assess the expression level of PD-L1 in tumors in real time, and help to evaluate the efficacy of immunotherapy. We conjugated IRDye800CW to Atezolizumab, and administered intravenously to balb/c mice bearing CT26 tumors overexpressing PD-L1. Similar to the SCC-1 model, translation of NIR-I and NIR-IIa images enhanced T/NT up to ~20 from ~5. The same neural network was compatible with different targeting ligands and tumor types, establishing the generality of this method.

To compare deep-learning-enhanced NIR-IIa imaging with real NIR-IIb imaging, we conjugated a small-molecule NIR-IIa dye IR12-NHS49 and a NIR-IIb PbS/CdS core-shell quantum dot to Atezolizumab, and intravenously injected into a CT26-bearing balb/c mouse. At 24 hours post injection, we recorded wide-field images of the tumor in both NIR-IIa window by detecting the IR12-anti-PDL1 (1,000-1,200 nm) and in the NIR-IIb window by detecting PbS/CdS-anti-PDL1 (1,500-1,700 nm). Upon transforming the NIR-IIa image, the measured T/NT of the generated image was much higher than that of the original NIR-IIa image, and approached to that of the ground-truth NIR-IIb image (T/NT~26.2 in generated image vs. 8.46 in NIR-IIa and 30.8 in NIR-IIb). Furthermore, the generated image resembled the ground-truth NIR-IIb image, showing similar cross-sectional intensity profiles in the tumor area. This result showed that with deep learning, molecular imaging in NIR-IIa (1000-1300 nm) afforded similar results as in NIR-IIb.

Deep Learning for NIR-II Light-Sheet Microscopy

Light-sheet microscopy (LSM) in the NIR-II window is a recent development allowing in vivo volumetric optical imaging of mouse tissues with a high spatial and temporal resolution in a non-invasive manner. Both the excitation and emission wavelengths have been shifted to the 1300 nm range to suppress light scattering and increase imaging depth/volume. Here, we explored deep learning for NIR LSM with organic probes. For comparison two nanoparticle based NIR-II probes p-FE (785 nm excitation, 1,000-1,300 nm emission in NIR-IIa) and PbS/CdS CSQD (785 nm excitation, 1,500-1,700 nm emission in NIR-IIb) were injected to the same mouse. The mouse was euthanized at 30 minutes after administration, and ex vivo imaging of the brain vasculatures containing the circulating fluorescent probes was performed with our home-build light-sheet microscope described previously (see reference 9 and methods for details). We first used the pre-trained U-Net generator to transform the NIR-IIa LSM images to NIR-IIb ones. However, compared to the ground-truth NIR-IIb LSM images, the generated results showed broadening of structures and artifacts such as vertical stripes. This could be attributed to mismatched distribution between the training data (whole-body imaging) and the test data (LSM imaging). Compared to whole-body low magnification images, LSM images had a much smaller field of view and feature sizes, requiring alternative training methods for faithful transformation.

Figure 4A:
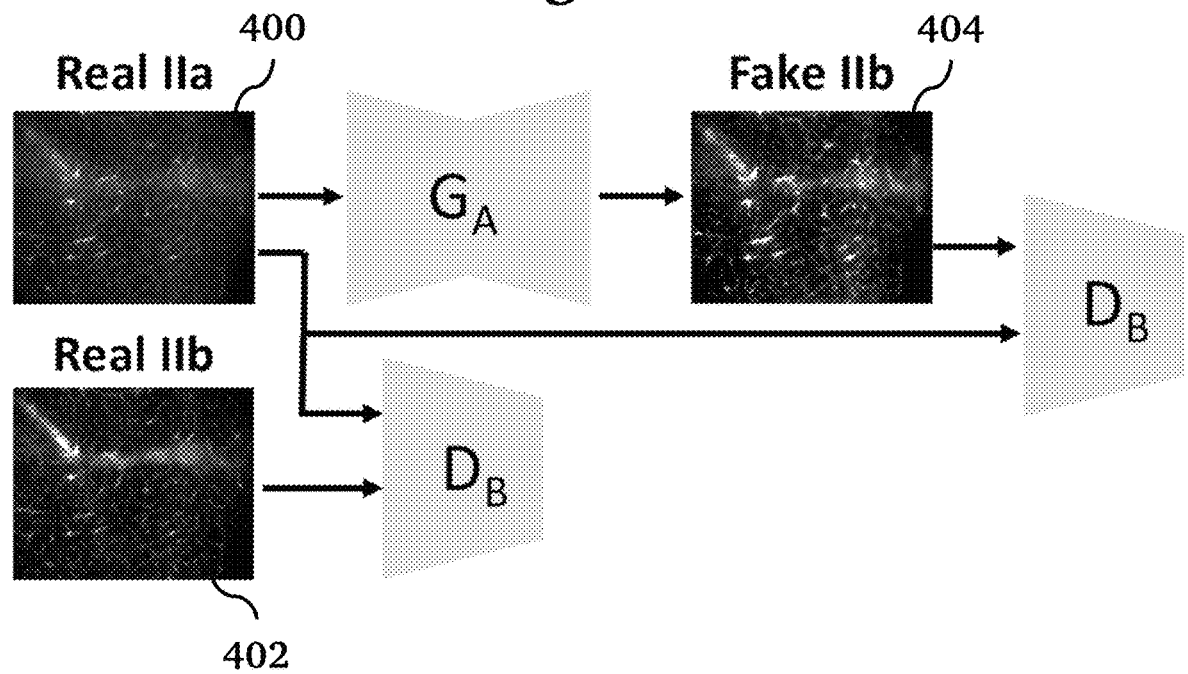
FIG. 4A shows a pix2pix model used for training a deep learning network to generate a NIR-IIb image from a NIR-IIa image, according to an embodiment of the invention.

We re-trained the neural network with matched NIR-IIa images and the corresponding NIR-IIb images recorded in the same tissue volumes using the supervised image-to-image translation algorithm (pix2pix). The pix2pix model utilized a generator $G_A$ to transfer a NIR-IIa LSM image to a NIR-IIb one, and a discriminator $D_B$ to differentiate real and fake NIR-IIb LSM images. Instead of using randomly selected images, a pair of NIR-IIa and NIR-IIb LSM images at the same position were used as inputs when training the neural network. Different from the unconditional GANs, the discriminator $D_B$ also took the input of the generator as its input. FIG. 4A shows the pix2pix model used for training. A pair of NIR-IIa and NIR-IIb LSM images 400 and 402 were selected from the training set. The NIR-IIa image was processed by the generator GA to obtain a fake NIR-IIb image 404. The real or generated IIb image was concatenated with the real IIa image, and used as an input of the discriminator $D_B$. The overall loss is a weighted sum of the adversarial loss ($L_{adv}$) and the L1 distance between the real and generated IIb images:

$$L(G_A,D_B)=L_{adv}(G_A,D_B)+L_{L1}(G_A).$$

Figure 4B:
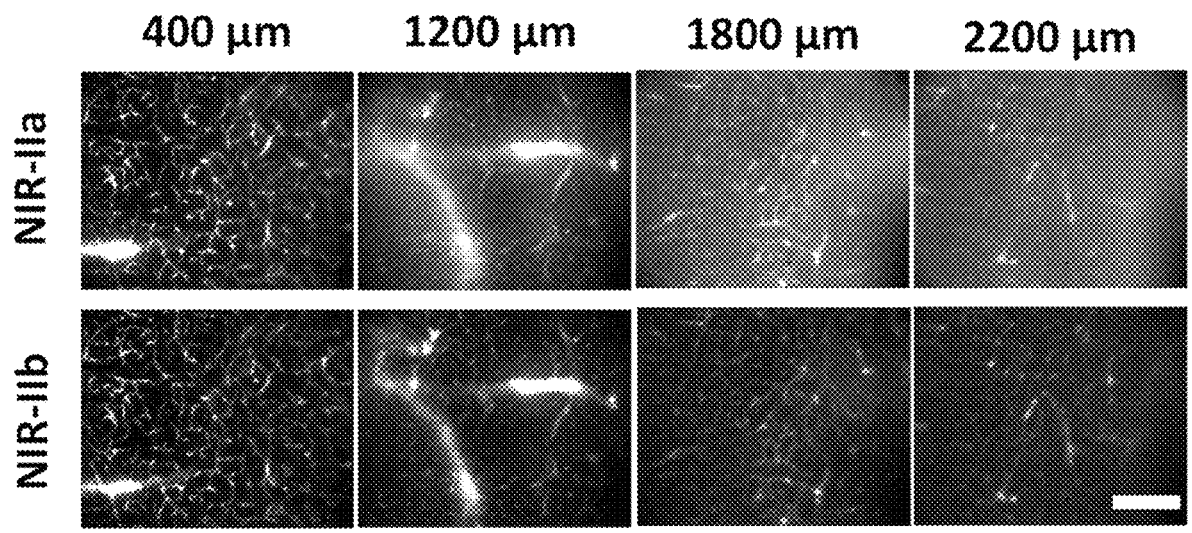
FIG. 4B is an image grid showing pairs of NIR-IIa and NIR-IIb LSM images at different depths from a training set, according to an embodiment of the invention.

We used a U-Net (FIG. 1D) as the generator and a PatchGAN (FIG. 1F) as the discriminator. The training set included 1,0000 NIR-IIa LSM images and 1,000 NIR-IIb LSM images, and the loss function was a weighted sum of the adversarial loss and L1 distance between the generated image and the real NIR-IIb image. FIG. 4B show examples of LSM images at different depths from the training set.

Figure 5A:
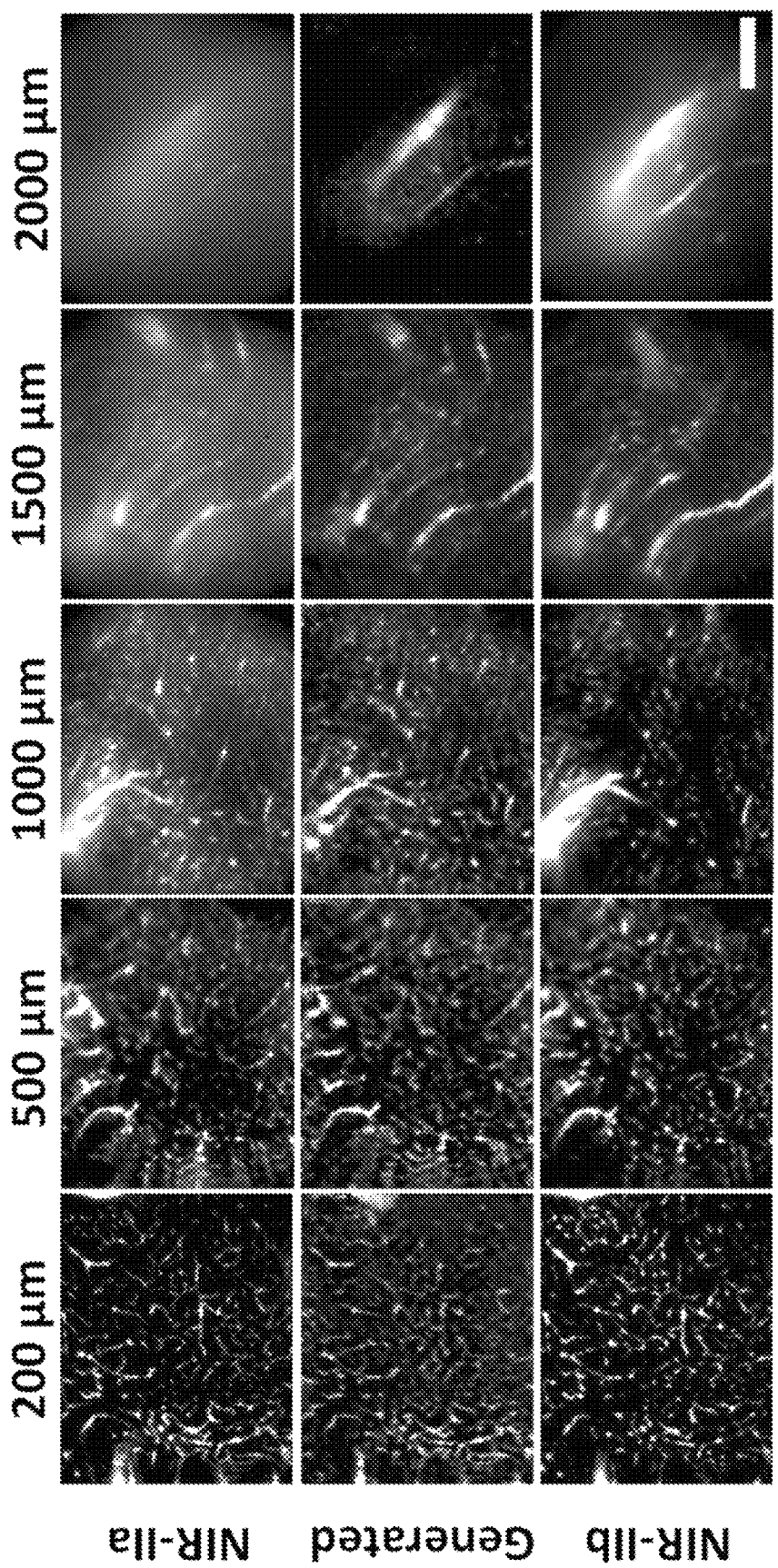
FIG. 5A is an image grid showing LSM images at different depths, including NIR-IIa, NIR-IIb, and generated images, according to an embodiment of the invention.
Figure 5B:
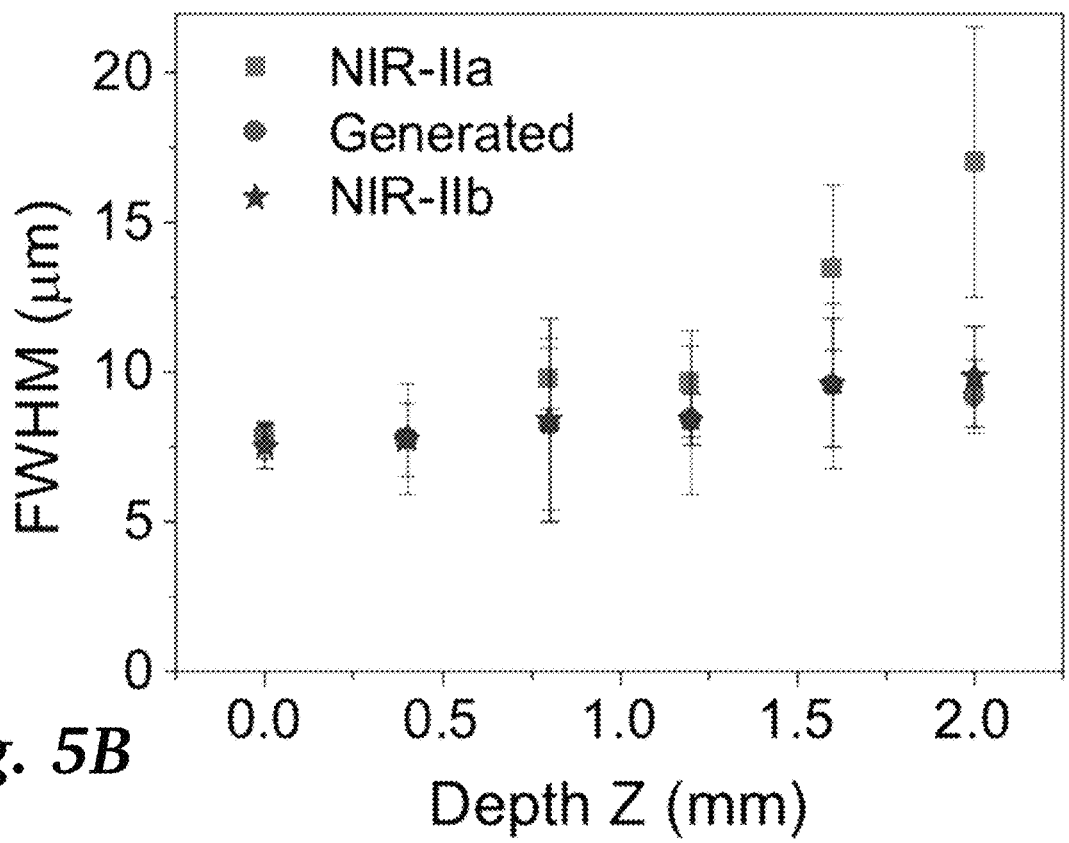
FIG. 5B is a plot showing a comparison of full width at half maximum (FWHM) for NIR-IIa, NIR-IIb, and generated images at various depths, according to an embodiment of the invention.
Figure 5C:
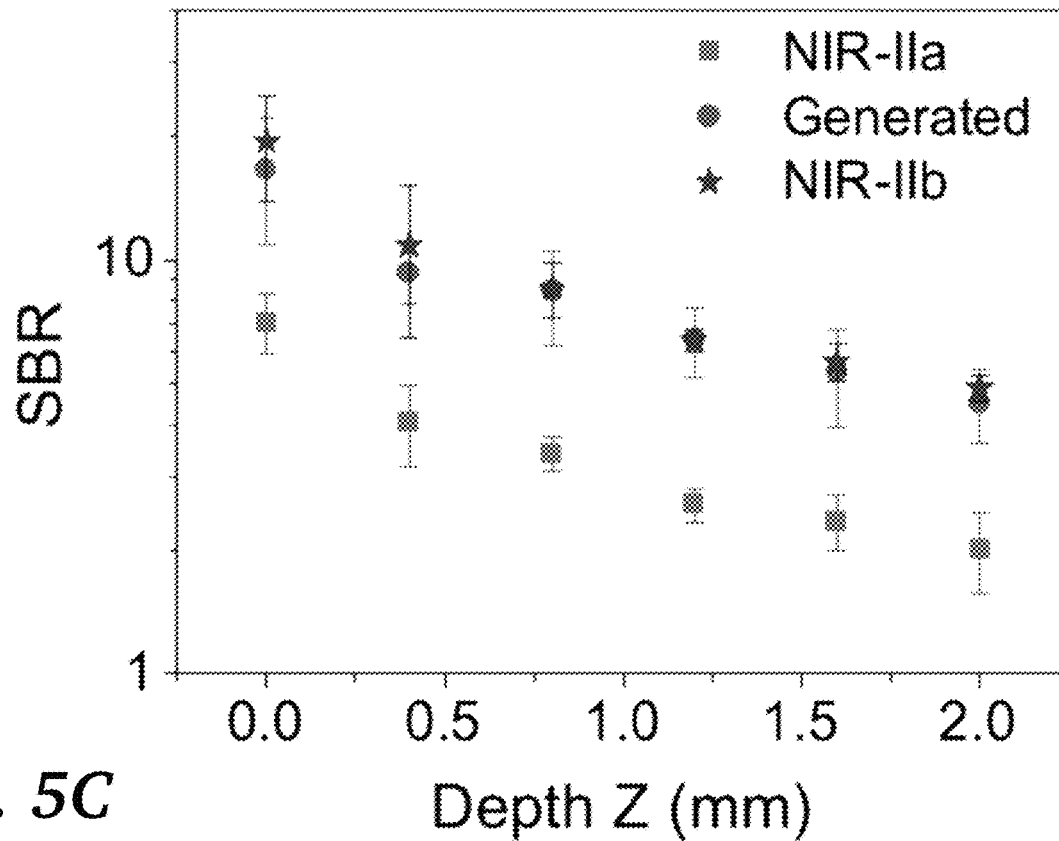
FIG. 5C is a plot showing signal to background ratio (SBR) for NIR-IIa, NIR-IIb, and generated images at various depths, according to an embodiment of the invention.

After training, NIR-IIa LSM images at different depths were used as inputs for the U-Net generator. The effect of tissue scattering made it difficult to identify cerebral vasculatures at a depth of >2.0 mm based on original images recorded in the NIR-IIa window. In contrast, in the deep learning generated image, background signal was significantly reduced, allowing similar 3D volumetric imaging quality to the ground-truth NIR-IIb LSM imaging. FIG. 5A shows NIR-IIa and NIR-IIb LSM images, together with generated images, at different depths. Further, we analyzed FWHM of the smallest vessels (results are graphed in FIG. 5B) and signal-to-background ratio (results are graphed in FIG. 5C) at different depths. The original NIR-IIa LSM data suffered from broadened vessels and reduced SBR at deeper tissue penetration depths, while the generated LSM were able to achieve similar results compared to the real NIR-IIb LSM data. Deep learning afforded a powerful approach to enhancing 3D volumetric imaging using LSM.

DISCUSSION

Fluorescence imaging is a useful modality to probe biological systems with high spatial and temporal resolution. Several fluorescent molecules and their conjugates have been approved by FDA for human use or progressed into clinical trials, but none of these molecules could emit in the NIR-IIb window to minimize light scatter and maximize imaging depth and resolution. Although the image quality can be significantly improved by utilizing the off-peak emission tail in the NIR-IIa window, it is far from optimal owing to residual tissue light scattering in the <1300 nm spectral range. Although other image processing methods, such as deconvolution, have been explored to improve the resolution of the fluorescence imaging, these methods rely on a priori information about the specific imaging system, and are difficult to generalize to new optical systems.

This work developed a deep learning-based method to transform a NIR-I or NIR-IIa image to a NIR-IIb one possessing the highest signal/background ratios and spatial resolution among all one photon NIR imaging approaches. None of the data shown in this work was seen previously by neural networks, suggesting the methods generalized well to new imaging data. We also showed that the method is compatible with a wide range of NIR fluorophores and targeting ligands, regardless of their detailed optical and biological properties, establishing the versatility of this framework.

The ability to generate high-resolution images from scattering-blurred NIR images by neural networks could open new opportunities in clinical translations. Instead of trying to improve the biocompatibility and alleviating the toxicity of the nanoparticle-based NIR-IIb fluorophores, one could apply FDA-approved molecules directly and transform the low-resolution images to high-resolution ones, which would be an excellent application of artificial intelligence. We demonstrated here that an unprecedented lymph node-to-background ratio of >100 could be achieved for ICG based imaging after transformation by the neural network, which could enhance sentinel lymph node mapping in the clinic. Furthermore, tumor-to-normal tissue signal ratio could be significantly improved in a mouse model of colon cancer and a mouse model of head and neck cancer after administration of IRDye800CW-antibody conjugates, and clearer tumor margins were identified. These results could facilitate fluorescence imaging for diagnosis of tumors or guided resection of tumors. We expect that a similar training scheme can be adapted for training neural networks to transform images to sharp NIR-IIb images for larger animals or human. Alternatively, parameters of the neural networks trained on imaging data of small animals can be used as a starting point, and a transfer learning approach can be used to fine-tune the model. Ultimately, one may be able to apply the deep learning-based NIR fluorescence image processing methods for human use in the clinic.

In addition to applications in clinical diagnostics and imaging-guided surgery, neural network-enabled NIR fluorescence imaging could also provide a powerful tool for biomedical research. For instance, NIR-II LSM shown in this work allowed in vivo and ex vivo three-dimensional deep-tissue imaging at cellular resolution with small-molecule fluorescent probes. For the first time, we showed that LSM in the NIR-IIa window could afford similar penetration depth and signal-to-background ratio to LSM in the NIR-IIb window, suggesting that we could perform LSM in a wider wavelength region without compromising performance. With the expanded optical window, more candidate fluorophores could be utilized, enabling probing of more biomarkers at the same time. Further, the reduced size of these small-molecule probes compared to nanomaterials allowed easier migration in biological tissues, which leads to more precise localization of the targeted structures. With the help of the deep neural networks, the cost-efficient and less invasive LSM in the NIR-IIa window could become a complementary method to other in vivo optical imaging methods, such as two-photon microscopy.

Methods

NIR-II Fluorescent Probes

NIR-I and NIR-IIa fluorescent probes used in this work included high-pressure carbon monoxide conversion (HiPCO) single-walled nanotubes (SWNTs) (emission wavelength ~1,000-1,400 nm), 55-58, IR-FEP (emission peak ~1,047 nm), p-FE (emission peak ~1,010 nm), CPT (emission peak ~1,047 nm), ICG (tail emission in the NIR-IIa window), IRDye800CW (tail emission in the NIR-IIa window), IR12 (tail emission in the NIR-IIa window), IR783@BSA-GSH. NIR-IIb fluorescent probes used in this work included SWNTs synthesized by laser vaporization (LV) (emission wavelength ~1,100-1,800 nm), erbium-based down-conversion luminescent rare-earth nanoparticles with cerium doping (Er-RENPs) (emission peak ~1,550 nm), cubic-phase erbium-based rare-earth nanoparticles (ErNPs) (emission peak ~1,600 nm), core-shell lead sulfide-cadmium sulfide quantum dots (emission peak ~1,600 nm) coated by mixed methoxypolyehtylene glycol amine (mPEG-NH2) and branched 8-arm polyethylene glycol amine (8-Arm-PEG-NH2) (CSQDs) or cross-linked polymeric layers ($P^3$-QDs). Detailed structures, synthetic methods and optical properties of the fluorescent probes can be found in the published literature known to those skilled in the art.

Wide-Field NIR-II Fluorescence Imaging

Wide-field NIR-II fluorescence imaging was performed according to conventional methods known in the art. In a typical experiment, a mouse injected with NIR-II fluorescent probes was mounted on the stage beneath the laser. The excitation light was provided by an 808- or a 975-nm diode laser at a power density of 70 mW/cm$^2$. The emission light was focused by a pair of achromatic lenses (focus=75 mm and 200 mm, respectively), and magnification of the images could be tuned by adjusting the relative position of the lenses. A two-dimensional, water-cooled 640×512 InGaAs array (Ninox 640, Raptor Photonics) was used to record the image. Different emission filters were applied to collect signal in different wavelength windows. For NIR-I imaging, an 900-nm long-pass and an 1,000-nm short-pass filters were used; for NIR-IIa imaging, a 900-nm and a 1,100-nm long-pass filters were used; for NIR-IIb imaging, a 1,100-nm and a 1,500-nm long-pass filters were used.

Fluorescence images were saved as 8-bit grayscale images with a size of 640×512 pixels. Pixel values of an image were normalized according to the following equation before being used as the input for the neural networks:

$$I_{in}(x,y)=[(I_0(x,y)-\min)/(\max-\min)-0.5]/0.5,$$

where $I_0(x,y)$ is the intensity at the position (x,y) and min and max are the minimal and maximal intensity of the image, respectively. The output of the neural network was converted to an 8-bit grayscale image according to the following equation:

$$I(x,y)=(0.5 I_{out}(x,y)+0.5)\times 255,$$

where $I_{out}(x,y)$ is the value of the output at the position (x,y). We collected 1,024 NIR-IIa images and 1,800 NIR-IIb images, which were randomly split into training, validation and test data set at a ratio of 80:10:10.

CycleGAN Structure and Training

For neural network training, we developed our own computer codes and utilized open-source libraries including the machine learning framework PyTorch (https://github-.com/pytorch/pytorch) and the original implementation of CycleGAN (https://github.com/junyanz/pytorch-Cycle-GAN-and-pix2pix). Let A and B be sets of NIR-IIa and NIR-IIb images, respectively. We defined a generator $G_A$ which mapped a NIR-IIa image to a NIR-IIb image, and a generator $G_B$, which mapped a NIR-IIb image to a NIR-IIa image. We tried two different architectures for the generator.

The first architecture is a U-Net structure consisted of an encoding path and a decoding path (FIG. 1D). The encoding path contained repeated applications of two 3×3 convolution layers followed by a 2×2 max pooling for down-sampling. In each decoding step, the feature map was first up-sampled by a 2×2 transposed convolution, and then concatenated with the feature map from the encoding path, followed by two convolution operations. Each convolutional layer in the encoding and decoding paths was followed by an instance normalization and a ReLU activation. After the final decoding step, there is another 3×3 convolutional layer followed by a Tan h activation to generate the final image.

The second architecture is a ResNet structure which comprised of an encoding path, residual blocks and a decoding path (FIG. 1E). The encoding path is composed of three convolutional layers and the decoding path contained two transposed convolutional layers followed by a convolutional layer. Each convolutional layer was followed by an instance normalization layer and a ReLU activation layers, except for the last one, which used Tan h as the activation function.

We also defined two discriminators $D_A$ and $D_B$ to differentiate real and fake images in the NIR-IIa and NIR-IIb windows, respectively (FIG. 1F). The PatchGAN29 discriminator contained 5 convolutional layers, each followed by an instance normalization (except for the first layer) and a leaky ReLU activation with a slope of 0.2 for the negative input (except for the last layer). The receptive field of the final output is 70×70. In FIG. 1F, Convk-n-pa-sb is used to denote a convolution layer with n filters, kernel size of k, reflection padding of a and striding of b. InstanceNorm denotes an instance normalization layer. ReLU denotes ReLU activation function. MaxPoolingx denotes a max pooling layer with a kernel size of x. TransConvk-n-pa-sb denotes a transposed convolution layer with n filters, kernel size of k, padding of a and striding of b. Tan h denotes a tan h activation function. Skip connections are labeled with arrows.

The loss function of the network was defined as follows:

$$L_{adv}(G_A,D_B)=\mathbb{E}_{x\sim A}\|D_B(G_A(x))-1\|_2^2+\mathbb{E}_{y\sim B}\|D_B(y)\|_2^2$$

$$L_{adv}(G_B,D_A)=\mathbb{E}_{y\sim B}\|D_A(G_B(y))-1\|_2^2+\mathbb{E}_{x\sim A}\|D_A(x)\|_2^2$$

$$L_{cyc}(G_A,G_B)=\mathbb{E}_{x\sim A}\|G_B(G_A(x))-x\|_1+\mathbb{E}_{y\sim B}\|G_A(G_B(y))-y\|_1$$

$$L(G_A,G_B,D_A,D_B)=L_{adv}(G_A,D_B)+L_{adv}(G_B,D_A)+\lambda L_{cyc}(G_A,G_B).$$

The adversarial loss $L_{adv}$ was a mean squared error loss, and the cycle consistency loss $L_{cyc}$ was a L1 loss. The total loss was a weighed sum of the adversarial loss and the cycle consistency loss. We set the hyperparameter $\lambda=10$ for all the experiments. The generators were trained to minimize the loss, while the discriminators were trained to maximize the loss.

All the weights of the neural networks were initialized with a normal distribution with a mean of 0 and a standard deviation of 0.02, and all the bias terms were initialized as 0. The networks were trained on a Nvidia Tesla K80 GPU. To train the neural networks, we applied an Adam optimizer with hyperparameters $\beta=0.5$ and $\beta=0.999$. For the U-Net generator, the QP learning rate was 0.0002 for 60 epochs. For the ResNet generator, the learning rate was 0.0002 for the first 50 epochs and then decayed linearly to 0 for the next 50 epochs. A batch size of 1 was used during training. In each iteration, a random NIR-IIa image and a random NIR-IIb image were selected from the training data, and the loss was computed. The generated fake images were stored in a fake image pool. The optimizer then updated the parameters of the generators. Then the loss of the discriminators was calculated using the real image and a random image from the fake image pool, and the optimizer updated the parameters of the discriminators. After training, the generator $G_A$ was used to transfer an input NIR-IIa image to an image that resembled a NIR-IIb image.

Conjugation of Antibody to IRDye800CW

IRDye800CW was dissolved in DMSO at a concentration of 4 mg/mL. 4 µL IRDye800CW-NHS, 500 µL antibody (Atezolizumab or Cetuximab, 1 mg/mL in PBS buffer) and 100 µL dipotassium phosphate (1 M in water) was mixed, and the solution was shaken at room temperature for 3 hours. The solution was then washed with a 100 k centrifugal filter for 5 times to remove excess dye.

Conjugation of IR12-NHS and $P^3$-QDs to Anti-PD-L1

$P^3$-QDs were first conjugated to anti-PD-L1 according to known methods. In a typical reaction, $P^3$-QDs (0.5 mg), anti-PD-L1 (Atezolizumab, 200 µg) and EDC (0.6 mg) were dissolved in 0.5 mL MES buffer (10 mM, pH=8.5, 800 µL), and the solution was shaken at room temperature for 3 hours. The solution was then centrifuged at 4,400 rpm for 30 minutes to remove large aggregates. The supernatant was washed with a 300 k centrifugal filters for 4 times, and then suspended in 200 µL PBS solution. IR12-NHS was dissolved in DMSO at a concentration of 4 mg/mL. 2 µL IR12-NHS and 40 µL dipotassium phosphate (1 M in water) was added to the $P^3$-QDs-anti-PD-L1 solution, and the solution was shaken at room temperature for 3 hours. The solution was then washed with a 100 k centrifugal filter for 5 times to remove excess dye.

NIR-II Light-Sheet Microscopy

Ex vivo NIR-II LSM was performed according to known methods. C57BL/6 mice were injected with p-FE (Absorbance=4 at 808 nm) and PbS/CdS CSQD (Absorbance=4 at 808 nm) at the same time. The mice were euthanized 30 minutes after administration, and the brain tissues were fixed with 10% neutral-buffered formalin at room temperature. The fixed brain tissues were washed with PBS solution twice, and then stored in glycerol at 4° C. before LSM imaging.

A home-built light-sheet microscope in a normal, non-oblique configuration was used for fluorescence imaging in the NIR-IIa and NIR-IIb windows. A 785-nm diode laser was cylindrically focused into static light sheets for optical sectioning, and a two-dimensional, water-cooled 640×512 InGaAs array (Ninox 640, Raptor Photonics) was used to record the image at different depths. A 5× illumination (NA=0.15, Nikon LU Plan, effective NA=0.039) and a 10× detection objective (NA=0.25, Olympus ULWD MIRPlan) were used. Lateral movement of the sample was performed using a translation stage (KMTS50E, Thorlabs), and the step size in z direction was 5 µm. The imaging objective was moved by a single-axis translation stage (MTS50-Z8, Thorlabs) to compensate for the discrepancy between position of the light sheet and working plane of the imaging objective. We collected 1,500 LSM x-y cross-sectional images at different z position in both windows, and 1,000 of them were used for training the pix2pix model.

Pix2pix Structure and Training

For neural network training, we developed our own computer codes and utilized open-source libraries including the machine learning framework PyTorch (https://github.com/pytorch/pytorch) and the original implementation of pix2pix (https://github.com/junyanz/pytorch-CycleGAN-and-pix2pix). Let A and B be sets of NIR-IIa and NIR-IIb images, respectively, and C be the joint distribution of the paired images. A generator $G_A$ was defined to transform a NIR-IIa LSM image to a NIR-IIb one, and a discriminator $D_B$ was used to tell the difference between real and fake NIR-IIb LSM images. We used a U-Net architecture (FIG. 1D) for $G_A$, and a PatchGAN architecture for $D_B$ (FIG. 1F). Different from the CycleGAN model, $D_B$ used a concatenation of a NIR-IIa image and a real (or generated) NIR-IIb image as its input. The loss function was defined as follows:

$$L_{adv}(G_A,D_B)=\mathbb{E}_{x\sim A}\|D_B(x,G_A(x))-1\|_2^2+\mathbb{E}_{(x,y)\sim C}\|D_B(x,y)\|_2^2$$

$$L_{L1}(G_A)=\mathbb{E}_{(x,y)\sim C}\|G_A(x)-y\|_1$$

$$L(G_A,D_B)=L_{adv}(G_A,D_B)+\lambda L_{L1}(G_A).$$

The adversarial loss $L_{adv}$ was a mean squared error loss, and the total loss was a weighted sum of the adversarial loss and the L1 loss between the real and generated NIR-IIb images. We set the hyperparameter λ=10 for all the experiments, and the goal is to solve the following optimization problem:

$$G_A^* = \arg\min_{\{G_A\}} \max_{\{D_B\}} L(G_A, D_B).$$

All the weights of the neural networks were initialized with a normal distribution with a mean of 0 and a standard deviation of 0.02, and all the bias terms were initialized as 0. To train the neural networks, we applied an Adam optimizer with hyperparameters β=0.5 and β=0.999. A batch size of 8 was used. The learning rate was 0.0002, and the networks were trained for 40 epochs. In each iteration, a batch of NIR-IIa and NIR-IIb LSM images at the same position were chosen from the training data set. Generated NIR-IIb images were obtained by feeding the real NIR-IIa images to $G_A$, which were then used to calculate the loss function. Parameters of $G_A$ were optimized by the optimizer. Subsequently, real NIR-IIa, real NIR-IIb and generated NIR-IIb images were used to calculate the loss function, and parameters of $D_B$ were optimized by the optimizer. After training, the generator $G_A$ with trained parameters was used for image processing. Three-dimensional images were reconstructed using the z slices by the ClearVolume package integrated with Fiji.

The invention claimed is:

1. A method for enhancing a near-infrared fluorescence image, the method comprising:
    providing a NIR fluorescence in vivo wide-field image produced by detecting light in the NIR-I or NIR-IIa windows emitted by fluorophores;
    inputting the NIR fluorescence in vivo wide-field image to a convolutional neural network to produce as output a translated image resembling a NIR-IIb image,
    wherein the convolutional neural network is trained using a set of NIR-I or NIR-IIa fluorescence images and a set of NIR-IIb fluorescence images;
    wherein the set of NIR-I or NIR-IIa fluorescent images and the set of NIR-IIb fluorescence images contain unpaired in vivo wide-field images of animals;
    wherein the convolutional neural network is trained using unsupervised training.

2. The method of claim 1 wherein the convolutional neural network is a U-Net.

3. The method of claim 1 wherein the convolutional neural network is trained using CycleGAN.

* * * * *